3,644,475
PRODUCTION OF ADIPONITRILE
Olav T. Onsager, Waldwick, N.J., assignor to
Halcon International, Inc.
No Drawing. Filed Mar. 27, 1969, Ser. No. 811,241
Int. Cl. C07c *121/26*
U.S. Cl. 260—465.8                     4 Claims

ABSTRACT OF THE DISCLOSURE

The process of the present invention provides for the preparation of adiponitrile through the liquid phase reaction of a 3-halopropionitrile with a reducing agent from the group titanium, gold, thallium, tin, lead, phosphorous, arsenic, antimony, bismuth or tellurium.

BACKGROUND OF THE INVENTION

This invention relates to a process for the reductive coupling of an organic halo compound. More particularly it relates to a process for the reductive coupling of a functionally substituted halo organic compound with a metal reducing agent in a lower stable oxidation state.

The extension of carbon chains by the reductive coupling of two groups is well known in the art. Organic coupling has been accomplished for example by the well known Wurtz reaction wherein an organic halide is coupled in the presence of metallic sodium. Similarly metal carbonyls have been employed in coupling reactions of organic halides. However, in these cases the coupling compound has been an activated compound containing activating groups such as allylic, benzylic, gem di-halides and 1,2 dihalides. The art has also demonstrated that non-activated organic halides do not undergo coupling reaction with metal carbonyls.

RELATED APPLICATION

In copending applications, Ser. No. 801,757 filed Feb. 24, 1969 and Ser. No. 801,758 filed Feb. 24, 1969, there are disclosed successful procedures for carrying out the reductive coupling of organic halo compounds. Suitable reducing agents are described in said applications for accomplishing the coupling in a highly selective fashion, the reducing agent being oxidized in molar quantity during the dimerization. The said applications describe suitable methods for recovering and regenerating the reducing agents for further use in subsequent reductive dimerizations.

SUMMARY OF THE INVENTION

It has now been found that functionally substituted organic halogen compounds can undergo a reductive coupling in presence of various other metal reducing agents. Although the invention has wide applicability, in an especially advantageous practice there is provided a procedure for producing adiponitrile—i.e., $$N\equiv C-CH_2-CH_2-CH_2-CH_2-C\equiv N$$

from 3-halo propionitrile. It will, of course, be understood that the adiponitrile is readily converted to hexamethylene diamine by known techniques.

DETAILS OF THE INVENTION

(A) The halo organic compound

The halo organic compounds which are reductively coupled in accordance with the invention are functionally substituted halo compounds where the halo is chlorine, bromine or iodine, with bromine being the preferred halogen. The halogen is contained on a primary or secondary carbon atom, preferably on the primary carbon. The functionally substituted organic moiety may be a paraffin (alkyl), cycloparaffin (cycloalkyl), alkenyl, cycloalkenyl, ar-alkyl, or ar-alkenyl. The functional substituent can be one of the halogens mentioned above, or may be a cyano, hydroxy, carboxylic acid, carboxylate (alkyl, patricularly lower alkyl carboxylates), halo, keto, aldehydo, nitro, amino, amido, sulfone and the like. The only critical feature of the starting compound is that it contains a halo group on a primary or secondary carbon atom and be substituted with a functional substituent as indicated above. An especially preferred group of functionally substituted halo organic compounds is that having the general formula

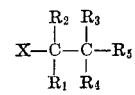

wherein X is chlorine, bromine or iodine and wherein $R_1$, $R_2$, $R_3$, $R_4$, and $R_5$ can be hydrogen, or a substituted or unsubstituted alkyl, aryl, alkaryl, aralkyl or alkenyl group. In especially preferred practice, $R_1$, $R_2$, $R_3$ and $R_4$ are hydrogen and $R_5$ is a functional group which activates the alpha-beta double bond in Michael acceptors and is preferably —CN, —COOR$_6$, —CONHR$_6$, —CONR$_6$R$_6$, —COOH, —CONH$_2$, —NO$_2$, —COR$_6$, or —SO$_2$R$_6$, R$_6$ being an alkyl group having 1 to 10 carbon atoms.

The alkyl compounds may contain a lower alkyl moiety of from 2 to 6 carbons and be such compounds as 3-bromopropionitrile, 3-bromopropylamine hydrobromide, 3-chloropropanol, 3-bromobutanol, ethylenebromohydrin, 3-bromobutyric acid, methyl-4-chlorobutyrate, 3-bromopropionitrile, 3-chloronitropentane-1, 1,3 di-bromopropane and the like; or substituted halo alkanes of from 7 to 12 carbons such as 6-bromocaproic acid, 8-chlorooctanol and the like. The cycloalkane compounds may contain from 3 to 6 carbon atoms in the ring such as 2-bromocyclohexanol. The alkene compound may be a lower alkenyl (2–6) or an alkenyl of from 7 to 12 carbons, containing functional substituents as indicated above. A representative compound of this class is 4-chlorocrotonic acid. The cycloalkenyl compounds may contain from 3 to 6 carbon atoms in the ring. The aralkyl and ar-alkenyl compounds are those containing a phenyl moiety and an alkyl or alkenyl moiety as described above for the alkanes and alkenes. Representative compounds are p-nitro-benzyl chloride, 2(2,4-dichlorophenyl) ethyl bromide and the like.

(B) The reducing agent

The reductive coupling of the present invention is carried out in the presence of a metal reducing agent. Reducing agents which are suitably used are Ti, Au, Tl, Sn, Pb, P, As, Sb, Bi, Te, or mixtures of any two or more of the above.

The reducing agent comprises the above metals in the lower stable oxidation state and is employed in the form of a compound or complex having substantial solubility in the reaction system, i.e., soluble in sufficient quantity to provide the desired amount of reactant.

In practice of the invention, the Cu, Au Hg and Tl reducing agents are employed in the plus one valence state. The Ti, Sn, Pb and Te reducing agents are used in the plus 2 valence state. The P, As, Sb, and Bi reducing agents are use in the plus 3 valence state.

In general, the reducing agent is incorporated in the reaction system in the following forms:

(a) As organic or inorganic salts of the metal, such as illustrated by the acetates, bromides, chlorides, carbonates, chromates, sulfates, cyanides, fluorides, hydroxides, iodides, nitriles, nitrates, oxides, sulfides, thiocyanates, vanadates, naphthenates, octoates, propionates, thioalcoholates, alcoholates, amides, oxalates, adipates, benzoates, citrates, lactates, maleates, phosphates, and the like.

(b) As organometallic compounds, i.e., compounds having a metal carbon bond such as metal alkyls, metal cycloalkyls, metal phenyls, metal alkenyls, metal cycloalkenyls, metal aralkyls, metal aralkenyls, and the like. The organic radicals can be substituted, desirably with the functional groups shown above.

(c) As chelate compounds, such as acetyl acetonates and other 1,3-diketonates, diethyltriamines, and the like. In a more complete description of ligands forming appropriate chelates, see those listed at pages 529–531 of "Advanced Inorganic Chemistry" by Cotten and Wilkinson, 1962, published by Interscience Publishers.

(d) as Lewis base complexes of the catalyst forms given above in (a) through (c). Illustrative Lewis bases forming such complexes are compounds containing trivalent nitrogen, trivalent phosphorous, antimony and bismuth, and divalent oxygen and sulfur. These may be illustrated by ammonia, amines, pyridines, phosphines, arsines, stibines, ethers, tioethers, and the like.

A preferred group of reducing agent is titanium, gold, thallium, and tin.

An especially desirable group of catalysts is titanium, thallium, and tin.

Illustrative reducing agents for use in the invention are: $Cu_2Br_2$, $Cu(OOCCH_3)$, $[As(CH_3)_3]CuI$, $Hg_2Cl_2$, AuCn, TlBr, Tl(acetylacetone), $[Tl(thiourea)_4]Cl$, (Cyclopentadienyl)Tl, $SnBr_2$, $P(C_6H_5)_3$, $$P(CH_2-CH_2-C\equiv N)_3$$

$As(n-C_4H_9)_3$, $Sb(n-C_4H_9)_3$, $Bi(n-C_4H_9)_3$, $PbBr_2$, $Pb(OOCCH_3)_2$, $TiBr_2$, and $Ti(acetylacetonate)_2$.

As above indicated, the reducing agent is incorporated in the reaction system in sufficient amount to provide for the desired reductive coupling. By reductive coupling as used in the present specification and claims is meant a coupling of two molecules of the halo organic compound by the displacement of the halogens and the attachment of the carbons which contained these halogens to one another. Where a single halo organic compound is employed, the couupled product will represent a reduced dimer of the precursor of the halo organic compound. Where a mixture of different halo organic compounds is employed the coupled product will represent a mixture of dimers of the precursors of each of the halo compounds as well as co-dimers.

(C) Reaction conditions

The reductive coupling is carried out in liquid phase with the total system pressure being sufficient to maintain the liquid phase, e.g. 0.1 to about 4000 atmospheres, preferably 1 to about 100 atmospheres.

The reaction temperature can range from 0 to 250° C. desirably from 50 to 200° C. and preferably from 100 to 170° C. The reaction time is sufficient to achieve the desired conversion and suitable reaction times range from 1 minute to about 50 hours, desirably 30 minutes to 40 hours, and preferably 2 to 20 hours.

In an especially preferred practice of the invention, the precursor which, upon addition of hydrogen halide, forms the functionally substituted halo organic compound is incorporated in the reaction system.

For example, in the case of 3-halopropionitrile, it is advantageous to incorporate acrylonitrile in the reaction system.

Solvents can be employed with materials which are formed during the reaction being preferred. For example, adiponitrile or propionitrile are preferred solvents in the couplnig of 3-halopropionitrile. Other solvents can, however, be employed as illustrated by benzene, acetonitrile, acetic acid, ethyl acetate, chlorobenzene, benzonitrile, heptane, dimethyl formamide, dioxane, cyclohexane, tetrahydrofuran, triethylene glycol, and the like.

Suitable mixtures for accomplishing the reductive coupling may have the following illustrative composition by weight on a reducing agent free basis:

|  | Percent | | |
| --- | --- | --- | --- |
|  | Broad | Desired | Preferred |
| Halo organic compound | 10–100 | 20–99 | 50–95 |
| Halo organic compound precursor | 0–90 | 1.0–80 | 5–50 |
| Solvent | 0–90 | 1.0–40 | 2–10 |

(D) Reducing agent regeneration

The oxidized form of the reducing agent can be regenerated by reduction with hydrogen or with known type chemical reducing agents such as sulfur dioxide, hydrogen sulfide, zinc, alkyl aluminum compounds, and the like. Hydrogen is the preferred reducing agent, by far, and can be used alone or together with known type hydrogenation catalysts such as platinum, palladium, nickel, and the like.

Preferably the reducing agent in oxidized form is recovered by water extraction from the reaction product. The aqueous solution can be treated directly with the reducing agent, e.g. Pt on carbon suspended therein and hydrogen passed therethrough in order to regenerate the reducing agent in its lower oxidation state. The reducing agent can then be recovered by known methods including crystallization, and the like.

The amounts of reactants are generally such that the halo organic compound is present in excess of that which will react with the reducing agent although an excess of reducing agent can be used. Illustrative concentrations of reducing agent are 1–25% by weight of the entire reaction mixture, desirably 2 to 15% and preferably 5 to 12% by weight.

ADIPONITRILE PRODUCTION

The present invention is especially useful for the production of adiponitrile and exceedingly high reaction selectivities can be achieved.

In this embodiment of the invention the halo organic compound is 3-bromopropionitrile, 3-chloropropionitrile or 3-iodopropionitrile, or mixtures. The bromo compound is preferred.

In an illustrative practice, the 3-halopropionitrile is contacted with the reducing agent in its lower oxidation state at the reaction conditions and product adiponitrile is recovered. In one practice, the 3-halopropionitrile and reducing agent are charged to the reactor, heated to the suitable reaction temperature, and maintained at reaction temperature until completion of the reaction whereupon the mixture is separated by distillation and/or extraction procedures to recover product. In this technique acrylonitrile is advantageously added with the 3-halopropionitrile to enhance the selectivity to the desired adiponitrile. The reducing agent in oxidized form is recovered and itself reduced preparatory to being reused in subsequent operations.

In an alternative practice, the process is carried out in accordance with continuous procedures. A reactor is charged with 3-halopropionitrile, acrylonitrile and reducing agent and heated to reaction temperature. Acrylonitrile, and 3-halopropionitrile and reducing agent are added continuously and liquid reaction mixture is continuously recovered. The liquid reaction mixture is separated by distillation and/or extraction with recycle of halo-propionitrile, and acrylonitrile, recovery of product adiponitrile, and recovery, regeneration and recycle of reducing agent.

Other procedures will be apparent to those skilled in the art and such alternatives can be used. For example, the halo organic compound which is coupled need not be added as such but can be formed in situ as by the reaction of hydrogen halide and appropriate precursor.

The following examples are intended to illustrate the invention:

EXAMPLES 1-6

In each of these examples, a stainless steel pressure vessel is charged with 134 g. of 3-bromopropionitrile, 27 g. acrylonitrile and the amount and type of reducing agent as indicated. Each reaction mixture is heated to 150° C. and maintained at this reaction temperature for 18 hours. Each reaction mixture is cooled and contacted with 100 ml. of water. The organic layer after phase separation is analyzed by gas chromatography and the concentration of adiponitrile therein is indicated below.

| Example | Reducing agent | Amount of reducing agent, g. | Product adiponitrile concentration, wt., percent |
|---|---|---|---|
| 1 | $TiBr_2$ | 20.8 | 3.2 |
| 2 | CuBr | 20.0 | 1.4 |
| 3 | AuBr | 27.7 | 6.2 |
| 4 | Tl acetylacetonate | 30.4 | 6.0 |
| 5 | Sn (acetate)$_2$ | 23.7 | 4.6 |
| 6 | Triphenyl phosphine | 26.3 | 2.1 |

EXAMPLE 7

A steel pressure vessel is charged with 90.0 g. 3-chloropropionitrile, 27.0 g. of acrylonitrile, and 30.4 g. of thallium acetylacetonate. The reaction mixture is heated to 170° C. and at this temperature for 18 hours. The resulting reaction mixture is cooled, treated and analyzed as above described in connection with Examples 1-6. The reaction mixture organic phase is found to contain 2.1% by weight adiponitrile.

I claim:
1. The process for the preparation of adiponitrile which comprises reducitvely coupling 3-bromopropionitrile, 3-chloropropionitrile, 3-iodopropionitrile, or mixtures by reaction at 0 to 250° C. in the liquid phase at 0.1 to 4000 atmosphees pressure with a titanium, gold, thallium, tin, lead, phosphorous, arsenic, antimony, bismuth, or tellurium reducing agent, said reducing agent being employed in amount of from about 1 to 25% by weight of the reaction mixture.

2. The process of claim 1 wherein the 3-bromopropionitrile, 3-chloropropionitrile, 3-iodopropionitrile or mixtures is reacted with a titanium, gold, thallium or tin reducing agent.

3. The process of claim 1 wherein the halo organic compound is reacted with a titanium, thallium or tin reducing agent.

4. The process of claim 1 wherein the reaction is carried out in the presence of acrylonitrile.

References Cited

UNITED STATES PATENTS 3,397,252  8/1968  Jones _____ 260—465.8

JOSEPH P. BRUST, Primary Examiner

U.S. Cl. X.R.

260—464, 465 H, 475, 485, 515, 537, 558, 561, 590, 593, 607, 644, 645